US012505223B2

(12) United States Patent
Agron et al.

(10) Patent No.: US 12,505,223 B2
(45) Date of Patent: Dec. 23, 2025

(54) SYSTEM AND METHOD FOR DETECTING VULNERABILITIES IN CLOUD-NATIVE WEB APPLICATIONS

(71) Applicant: GITLAB INC., San Francisco, CA (US)

(72) Inventors: Dean Agron, Ra+3 anana (IL); Ron Vider, Hod HaSharon (IL)

(73) Assignee: GitLab Inc., San Francisco, CA (US)

( * ) Notice: Subject to any disclaimer, the term of this patent is extended or adjusted under 35 U.S.C. 154(b) by 74 days.

(21) Appl. No.: 17/731,549

(22) Filed: Apr. 28, 2022

(65) Prior Publication Data

US 2022/0350895 A1  Nov. 3, 2022

Related U.S. Application Data

(60) Provisional application No. 63/180,685, filed on Apr. 28, 2021.

(51) Int. Cl.
*G06F 21/57* (2013.01)

(52) U.S. Cl.
CPC ...... *G06F 21/577* (2013.01); *G06F 2221/033* (2013.01)

(58) Field of Classification Search
CPC ...... G06F 21/577; G06F 21/554; G06F 21/54; G06F 2221/033
See application file for complete search history.

(56) References Cited

U.S. PATENT DOCUMENTS

| | | | | |
|---|---|---|---|---|
| 9,479,526 B1* | 10/2016 | Yang | | G06F 21/554 |
| 11,811,801 B2* | 11/2023 | Chang | | H04L 63/0227 |
| 2016/0315960 A1* | 10/2016 | Teilhet | | G06F 21/55 |
| 2017/0098071 A1* | 4/2017 | Stopel | | G06F 21/554 |
| 2018/0088935 A1* | 3/2018 | Church | | G06F 11/3051 |
| 2019/0332366 A1* | 10/2019 | Natanzon | | G06F 11/3696 |
| 2020/0082095 A1* | 3/2020 | Mcallister | | G06F 11/323 |
| 2020/0097662 A1* | 3/2020 | Hufsmith | | H04L 9/0643 |
| 2020/0401379 A1* | 12/2020 | Appel | | G06F 8/61 |
| 2021/0133086 A1* | 5/2021 | Joyce | | G06F 11/3692 |
| 2021/0334384 A1* | 10/2021 | Ranjan | | G06F 11/3636 |
| 2022/0172067 A1* | 6/2022 | Kang | | G06N 3/088 |

* cited by examiner

*Primary Examiner* — Alexander Lagor
*Assistant Examiner* — Taylor P Vu
(74) *Attorney, Agent, or Firm* — Fenwick & West LLP

(57) ABSTRACT

A method for assessing vulnerable flows in a cloud-native application, the method including the steps of: mapping runtime functions in microservices in the cloud-native application; mapping the application cloud-native stack infrastructure configurations; mapping logical flows between microservices and third-party components in the cloud-native application; creating and executing security tests on the mapped logical flows, infrastructure configurations and runtime functions to return tested runtime behavior; and analyzing the tested runtime behavior of the cloud native application to validate the potential vulnerable logical flows so as to return validated vulnerable flows.

9 Claims, 1 Drawing Sheet

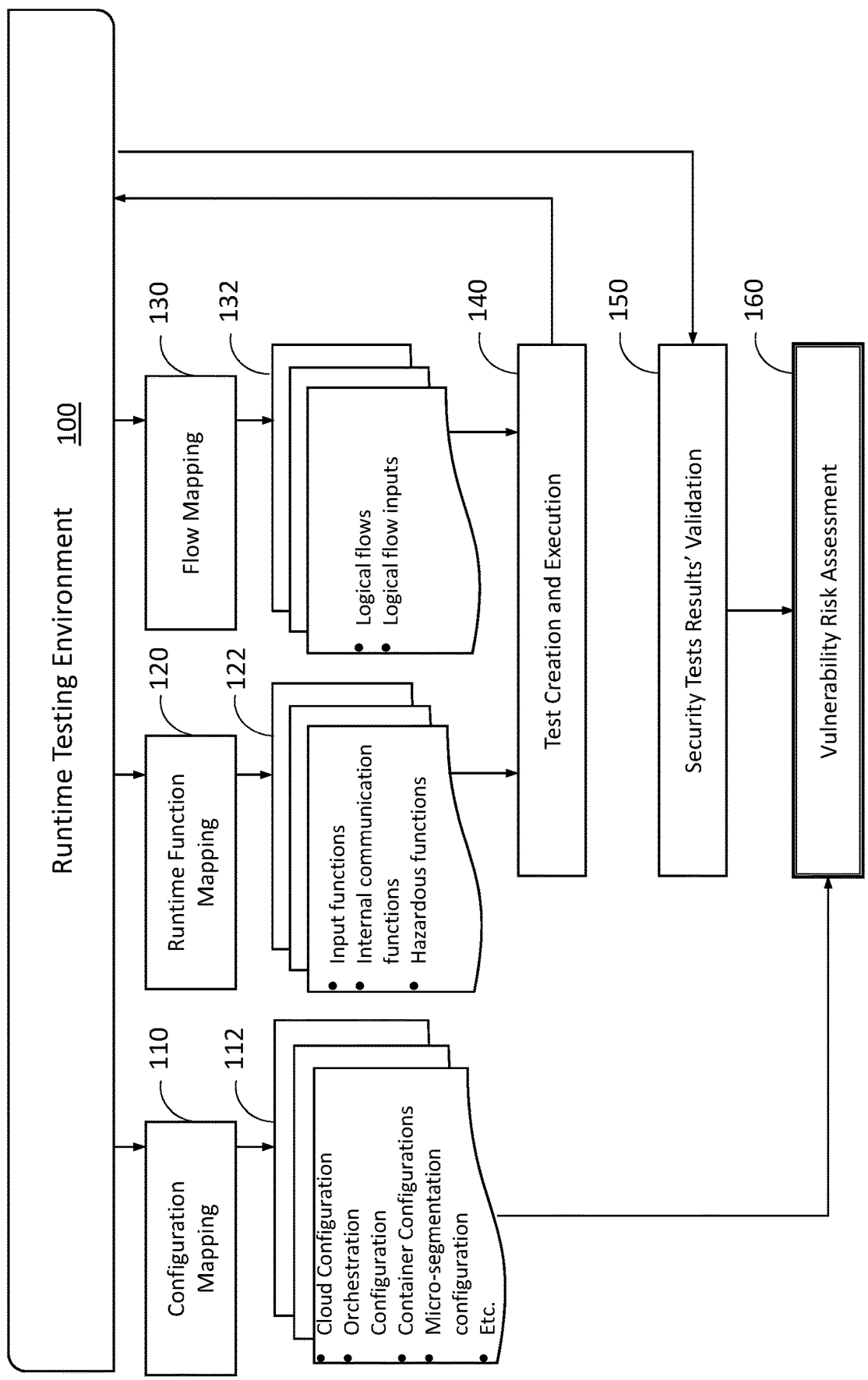

SYSTEM AND METHOD FOR DETECTING VULNERABILITIES IN CLOUD-NATIVE WEB APPLICATIONS

FIELD OF THE INVENTION

The present invention relates to cybersecurity and, more particularly, to a method and system for tracing and risk assessing of vulnerable application flows in cloud-native applications.

BACKGROUND OF THE INVENTION

With the shift to cloud-native applications, there is a dramatic change in the way applications are developed and deployed. The legacy monolith application, which used to be a block of custom code installed on a single bare-metal server, is transitioning into hundreds of small independent pieces of code, installed on loosely coupled microservices, executed as orchestrated containers, and deployed in the cloud. This change is also reflected in the vulnerabilities landscape—in the monolith architecture, it is well defined where the vulnerability starts (aka. "source") and where it ends (aka. "sink")—all on the same piece of code \ software. In cloud-native applications, vulnerabilities are transitioning into flows, which stretch over multiple pieces of code and infrastructure layers. This tectonic shift poses challenges to existing application security testing solutions, which are quickly becoming outdated and ineffective. This results in poor application security posture, high cost of integration, and waste of developers' time.

SUMMARY OF THE INVENTION

The present invention successfully addresses the shortcomings of the presently known solutions and technologies by providing a new technology that harnesses the advantages of cloud-native architectures by integrating seamlessly with all application components during runtime. The technology works in multiple phases to find and prioritize vulnerabilities in custom code developed by R&D teams, $3^{rd}$ party packages and hard-coded secrets.

According to the present invention there is provided a method for assessing vulnerable flows in a cloud-native application, the method including steps of: mapping runtime functions in microservices in the cloud-native application; mapping the cloud-native application stack infrastructure configurations; mapping logical flows between microservices and third-party components in the cloud-native application; the mapping steps being performed so as to return a list of potential vulnerable logical flows.

According to further features the method further includes: creating and executing security tests on the mapped logical flows, infrastructure configurations and runtime functions to return tested runtime behavior; and analyzing the tested runtime behavior of the cloud native application to validate the potential vulnerable logical flows so as to return validated vulnerable flows.

According to still further features the runtime functions include: input functions that receive input from external components, internal communication functions that are used for communication within a cluster, and hazardous functions that may lead to vulnerabilities.

According to still further features the logical flows are mapped from preexisting functional tests.

According to still further features the step of executing the security tests includes injecting custom crafted input into the mapped input functions.

According to still further features the validating includes inspecting how the injected custom crafted input reaches the hazardous functions.

According to still further features the method further includes: providing context to the vulnerable logical flows so as to return a vulnerable flow assessment.

According to still further features the context includes details provided from the step of mapping the logical flows.

According to still further features the context includes configurations of the vulnerable flows. According to still further features the configurations are received from the step of mapping the application stack configurations.

According to another embodiment there is provided a method for assessing vulnerable flows in a cloud-native application, the method including the steps of: mapping runtime functions in microservices in the cloud-native application; mapping the application cloud-native stack infrastructure configurations; mapping logical flows between microservices and third-party components in the cloud-native application; creating and executing security tests on the mapped logical flows, infrastructure configurations and runtime functions to return tested runtime behavior; and analyzing the tested runtime behavior of the cloud native application to validate the potential vulnerable logical flows so as to return validated vulnerable flows.

BRIEF DESCRIPTION OF THE DRAWINGS

Various embodiments are herein described, by way of example only, with reference to the accompanying drawings, wherein:

FIG. 1 is a high-level flow diagram of the instant method and application.

DESCRIPTION OF THE PREFERRED EMBODIMENTS

The principles and operation of a method for tracing vulnerable application flows in cloud-native applications according to the present invention may be better understood with reference to the FIGURE and accompanying description.

A cloud-native application is an application that is: built using microservices architecture, installed via containers, managed by an orchestration platform and deployed in a cloud environment.

FIG. 1 illustrates a high-level flow diagram of the instant method and application. The present method and system include a number of sub-processes that taken together provide the instant flow tracing process. The instant process takes place within a runtime environment. In example embodiments, the process takes place in staging environment or a Runtime Testing Environment 100. A number of steps or sub-processes are detailed hereafter. Some of the processes may run in parallel and some may run sequentially. Accordingly, the following description is not intended to limit the implementation of one or more of the sub-processes to the, or any, sequential order, unless specifically detailed otherwise.

One step or sub-process is Function-Runtime Mapping 120. Step 120 entails mapping runtime functions in microservices in the cloud-native application and instrumenting relevant code functions, which are later used for the risk assessment process. The step of mapping runtime functions is used to detect potential vulnerabilities using a static approach (in a runtime environment). The component (also referred to herein as an "observer", may be embodied, for example, as a container tool, such as a Kubernetes DaemonSet) observes each microservice in the environment and analyzes the files on the file system that are accessed by the microservice in runtime. Analysis of the files on the file system is employed to locate/detect security issues (vulnerabilities).

Mapped functions 122 include:
Input functions—functions that receive input from external components;
Internal communication functions—functions used for communication within the cluster; and
Hazardous functions—functions that may lead to vulnerabilities.

Another step in the method or sub-process of the is Configuration Mapping 110. In Step 110 the system/component maps the cloud-native application stack infrastructure configurations. This step allows the system to understand the way the application is built from an infrastructure perspective. In order to do this, the component fetches the data from the API of the infrastructure layers (Container, Cluster, and Cloud). The system collects configurations 112 of the entire application stack such as the container configuration, orchestration configuration, cloud configuration, micro-segmentation configuration, and so on. Legacy systems that map configurations only do that from an infrastructure security perspective without correlating it with the application layer security issues and, as such, do not have a complete understanding or knowledge of the real risks of the application.

According to features of the system, this data is later stitched to the results to provide an accurate risk assessment, showing each vulnerable flow found in the process.

Another step or sub-process is Flow Mapping 130. In step 130 the system maps logical flows between microservices and third-party components in the cloud-native application. The system recognizes logical flows 132, based on existing functional tests executed as part of the general testing, unrelated to the instant specific application. The system traces the connections between the microservices, by analyzing the communications between the microservices in the application layer. (Legacy products, at the most, only look at individual microservices for vulnerabilities.) The recognition is done based on the analysis of the inputs of the input functions and internal communication functions, and context propagation. That data is analyzed for the creation of the security tests, to determine if a flow is vulnerable or not.

The aforementioned mapping steps/sub-processes are performed to achieve the result of returning a list of potential vulnerable logical flows. In the list of logical flows that are potentially vulnerable, there may be an excessive number of false positive results. It is noted that the term excessive is relative and subjective (albeit easily recognized by practitioners for consuming more resources than desired or practical), however, for the sake of the instant disclosure, it can be said that the number of false positives is larger than none, or an insignificant number, or a tolerable number, or at least the number of false positives that are returned after the validation step(s) (discussed below).

It is noted that each of the mapping functions described heretofore have particular aspects that are not found in legacy systems. Furthermore, and importantly, no legacy systems assess cloud-native applications using data from all three of the sub-processed discussed above. As a result, none of those systems analyze the amount and type of data that the instant system and process does.

The next pair of steps are employed to validate the vulnerabilities using active payloads and analyze the behavior of the applications to reduce the number of false positives. The tracing process further includes a step or sub-process for the creation and execution of security tests 140. In step 140 the system creates and executes security tests for and on the mapped logical flows, infrastructure configurations and runtime functions. The goal of the tests is to return tested runtime behavior of the cloud-native application, which with then be analyzed. This sub-process is based on the Flow Mapping 130 and Function Runtime Mapping 120 sub-processes. The test creation and execution sub-process 140 creates security tests for the relevant flows, and conducts these by injecting custom-crafted input directly into relevant "Input\Output functions" that were mapped earlier in the process.

The next step/sub-process is termed Security Tests Results' Validation 150. In step 150 the system analyzes the aforementioned tested runtime behavior of the cloud-native application to validate each of the potentially vulnerable logical flows returned in the aforementioned list. The goal of the present sub-process is to return Validated Vulnerable Flows. Ideally, logical flows that have been validated or confirmed to be vulnerable, should have no false positives. Practically, the validation process reduces the number of false positives from that of the unvalidated list. The tracing application inspects how each custom-crafted test payload reaches hazardous functions by analyzing the hazardous functions. This analysis also shows the changes that were applied to the input while it went through the application flow.

In FIG. 1, note the arrow leading from the Testing sub-process/step 140 back to the runtime environment and the return arrow from the runtime environment—after injection of the malicious/vulnerability seeking test input, and tracing of that input throughout the logical flow—which goes to the Validation step 150.

Once the system collects the application configuration, application flows, and the security test results, the Vulnerability Risk-assessment sub-process/step 160 then adds the "context" of each flow and the relevant configuration of each vulnerability. This process yields an accurate and thorough assessment of vulnerable flows.

To this end, the collected data types (infrastructure configuration, potential vulnerabilities, flow tracing, and active validation) are sent for further processing and integration. In example embodiments, the data types may be sent to SaaS (Software as a service) for this processing. Using the aforementioned example embodiment, in the SaaS, the data is stitched together in order to provide a contextual risk assessment. With context, the security issues can be prioritized based on the actual risk they expose on the entire application.

The assessment of vulnerable flows is a contextual risk assessment that developers can integrate with their existing eco-system through, for example, chat apps, ticketing systems, and CI/CD platforms.

According to some example features, the application security teams and DevSecOps have a dedicated dashboard which provides a clear picture of which security issues exist in their cloud native applications.

The following real-world scenario serves as an example for the present method and system. An embodiment of the instant system or component is deployed as a Kubernetes DaemonSet within a testing environment, referred to in FIG.

1 as Runtime Testing Environment 100. In parallel, the system/component collects the following data:

In the configuration mapping step 110, the component maps the application cloud-native stack infrastructure configurations. In the example scenario, the component collects Docker and Kubernetes configurations (for example, Kubernetes network service).

In the logical flows mapping step 130, the component maps the logical flows between microservices and third-party components in the cloud-native application. This step provides flow tracing and understands the communication between the microservices (for example, a flow that starts on the API service goes through message queues up to the internal service).

In the runtime function mapping step 120, the component maps runtime functions in microservices in the cloud-native application. The component detects potential vulnerabilities in the custom code (for example, remote code execution vulnerability), known CVEs (Common Vulnerabilities and Exposures) and hard-coded secrets (for example, access keys to the cloud provider).

The aforementioned mapping steps are performed so as to return a list of potential vulnerable logical flows. The list of potential vulnerable logical flows may include false positives. The testing and validation steps are designed to provide a list of vulnerable logical flows which have been validated as such, thereby reducing, and in some cases eliminating, false positives.

According to the example mentioned above, later in the process, the remote code execution vulnerability will be stitched to the flow, and the beginning of the flow will be stitched to the Kubernetes network service to understand whether it is exposed to the internet and, therefore the risk is higher.

The instant innovative process has the following key features and provides the following benefits:

Vulnerability Flow Assessment—finding of application code vulnerabilities (such as: OWASP Top 10, OWASP API Top 10, SANS Top 25) including multi-layer and multi-service vulnerable flows, and flow-based risk assessment and prioritization to point out the exploitable vulnerabilities.

Clear remediation guidance—for each vulnerability flow found, the developer will receive a complete reproduction scenario, a graphic visualization of the flow, and the exact line in the code where the exploit occurs (stack trace)

Application microservices' mapping and visibility—for each environment in which instant application is installed, the users will receive a complete visualization of the running microservices and ancillary services.

Business flow risk assessment—The Application security team will get risk-scoring for the business flows, reflecting the combination of the vulnerability risk and the application flow importance.

Ease of Installation—The instant application is deployed within minutes by adding an autonomous component to the testing environment. Once deployed, the innovative component dynamically interacts with the different components and continually updates according to the environment changes, with no need for any manual changes.

While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:

1. A method for assessing vulnerable flows in a cloud-native application deployed in a runtime environment, the method comprising steps of:

deploying an autonomous testing component to the runtime environment, the autonomous testing component dynamically interacting with different components of the cloud-native application, the components of the cloud-native application including a cloud infrastructure, a plurality of application programming interfaces, and a plurality of microservices, wherein the autonomous testing component updates according to changes in the runtime environment without user input implementing updates to the autonomous testing component;

mapping, by the autonomous component, runtime functions in the plurality of microservices in the cloud-native application, wherein mapping the runtime functions comprises observing each microservice in the runtime environment and analyzing files on a file system that are accessed by the microservice, the runtime functions including input functions that receive input from external components, internal communication functions provide communication within a cluster in which one or more of the plurality of microservices are provided, and hazardous functions that may lead to vulnerabilities;

mapping stack infrastructure configurations of the cloud infrastructure of the cloud-native application;

mapping logical flows between the plurality of microservices and one or more third-party components in the cloud-native application based on an analysis of the inputs of the input functions and internal communication functions, said mapping of logical flows generating a list of potential vulnerable logical flows;

creating security tests to analyze runtime behavior to reduce false positives in the list of potential vulnerable flows;

executing the security tests on the mapped logical flows, the infrastructure configurations, and the runtime functions of the cloud-native application, wherein executing the security tests for a given logical flow of the mapped logical flows comprises:

creating a test input for an input function of the given logical flow;

injecting the test input directly into the input function of the given logical flow;

returning runtime behavior of the cloud-native application in response to the injecting of the test input; and processing the runtime behavior of the cloud-native application to identify false positives in the list of potential vulnerable flows, thereby producing a reduced list of validated vulnerable flows, the processing of the runtime behavior comprising tracing how the test input reaches hazardous functions and changes that are applied to the test input while the test input went through the given logical flow; and providing a visualization for display including information about at least some of the validated vulnerable flows.

2. The method of claim 1, wherein the mapping of the logical flows is further based on context propagation.

3. The method of claim 1, wherein said logical flows are mapped from preexisting functional tests.

4. The method of claim 1, further comprising:
   providing context to said vulnerable logical flows so as to return a vulnerable flow assessment.

5. The method of claim 4, wherein said context includes details provided from said step of mapping said logical flows.

6. The method of claim 4, wherein said context includes configurations of said vulnerable flows.

7. The method of claim 6, wherein said configurations are received from said step of mapping said application stack configurations.

8. The method of claim 1, wherein providing the visualization comprises:
   detecting an exploitable vulnerability in the reduced list of validated vulnerable flows; and
   generating a reproduction scenario of the exploitable vulnerability, wherein the reproduction scenario includes data inputs that led to the exploitable vulnerability occurring, or generating a visual representation of the logical flow that generated the exploitable vulnerability.

9. A method for assessing vulnerable flows in a cloud-native application deployed in a runtime environment, the method comprising steps of:
   mapping runtime functions in microservices in the cloud-native application, wherein mapping the runtime functions comprises observing each microservice in the runtime environment and analyzing files on a file system that are accessed by the microservices, the runtime functions including input functions that receive input from external components, internal communication functions provide communication within a cluster in which one or more of the plurality of microservices are provided, and hazardous functions that may lead to vulnerabilities;
   mapping application cloud-native stack infrastructure configurations;
   mapping logical flows between the microservices and third-party components in the cloud-native application, the mapping of the logical flows based on an analysis of the inputs of the input functions and internal communication functions;
   creating and executing security tests on said mapped logical flows, infrastructure configurations and the runtime functions to return tested runtime behavior, the security tests including injecting test inputs into the input functions of the mapped logical flows, wherein executing the security tests comprises:
      deploying man instant application into the cloud-native application in the runtime environment, wherein the instant application dynamically interacts with different components of the cloud-native application, the components of the cloud-native application including a cloud infrastructure, application programming interfaces and the microservices, and wherein the instant application continually updates according to environment changes without user input implementing updates to the instant application; and
   analyzing said tested runtime behavior of the cloud-native application to validate potential vulnerable logical flows so as to return validated vulnerable flows.

* * * * *